UNITED STATES PATENT OFFICE.

CARL A. NOWAK, OF ST. LOUIS, MISSOURI.

NON-INTOXICATING FERMENTED BEVERAGE AND PROCESS OF MAKING THE SAME.

1,243,440.   Specification of Letters Patent.   Patented Oct. 16, 1917.

No Drawing. Application filed March 22, 1915, Serial No. 16,258. Renewed March 15, 1917. Serial No. 155,111.

*To all whom it may concern:*

Be it known that I, CARL A. NOWAK, a citizen of the United States, residing at St. Louis, State of Missouri, have invented certain new and useful Improvements in Non-Intoxicating Fermented Beverages and Processes of Making the Same, of which the following is a specification.

This invention relates to a hopped and carbonated non-intoxicating fermented beverage produced from malt and malt adjuncts and has for its principal object to provide a beverage resembling beer which, while non-intoxicating, possesses palatable properties and which can be simply, rapidly and inexpensively prepared without requiring the long period of fermentation and storage commonly employed in the preparation of beer and so-called "temperance beer."

In the preparation of beers of low alcoholic content, it has, prior to this time, been customary to prepare a beer in the usual manner employed in the brewery and to subsequently remove a part of the alcohol by evaporation under reduced pressure, or by diluting a finished beer with a sugar containing solution in such manner as to reduce the alcoholic content to a low percentage.

In either case the process is expensive, of long duration and requires for its execution a fully equipped brewery with an elaborate refrigerating plant, large storage capacity, and a correspondingly large mash-tub and brew-kettle, and in addition to this in many cases the necessary equipment to effect the evaporation of alcohol under reduced pressure.

In the preparation of temperance beer according to the first of the customary methods, there results a great loss, not only in the alcohol which has been formed at the expense of the valuable and costly carbohydrate materials but also in the heat required to bring about the evaporation. Furthermore, by heating beer, even only to a relatively low temperature, many of the valuable and aromatic esters, the result of fermentation, which are of an extremely volatile nature, pass away together with the alcohol and the resulting beverage naturally lacks character.

The other customary process referred to, while to a certain extent overcoming the drawbacks of the above mentioned procedure, results in a beverage which lacks the necessary fermentative flavor, when a beer of 3.4% Balling produced from 12% Balling wort, (as is customary) is employed. According to "*American Handy Book of the Brewing, Malting and Auxiliary Trades,*" R. Wahl and M. Henius, third edition, 1908, vol. 2, page 1233, the following mixture would produce a beverage with less than ½ of 1 per cent. of alcohol: Kraeusen (slightly fermented beer) 5 parts, beer 7 parts, wort 43 parts and water 45 parts. This represents the dilution of 12 parts of beer mixture with 98 parts of unfermented wort and water mixture, or virtually 1 part of beer to 10 parts of unfermented solution possessing no fermentation flavor whatsoever. It is evident, therefore, that a beverage of this type lacks the characteristic properties of beer, viz. fermentation flavor and acid content.

My invention is designed to overcome these various disadvantages and to produce a beverage which to a considerable extent resembles beer and which can be prepared in only a few days' time.

By mashing malt with water in the preferred proportion of 2 parts by weight of malt and 5 parts by weight of water at a temperature of from 75° to 80° C. (167°–176° F.) in the preferred practice of my process, and holding this temperature for one hour or until the disappearance of the starch reaction, and then separating the solution from the grains by filtration or otherwise, I obtain a malt wort low in fermentable sugars and having a saccharometer indication of from 20 to 25% Balling. The grains are then washed with warm water until free from soluble matters, the washings being collected in a special vat to be later used for the purpose of sparging the hops remaining from the hop-boiling of the main mash, and flavored by boiling with a small quantity of fresh hops. The heavy malt wort is then run into the kettle and hopped by boiling ½ hour with the desired quantity of hops (1½ to 2½ lbs. per bbl.) one half of this quantity being added at the outset and the remaining half after 15 minutes boiling. After one half hour of boiling the solution is strained from the hops, its gravity having been increased as the result of evaporation of water so as to show a saccharometer indication of about 25-30% Balling, and cooled to about 20-25° C. (68°-77° F.) and at this temperature pitched with distillery or vinegar ferment (in the preferred amount of about 1 lb. per bbl.) or any other type of yeast associated with acid forming bacteria, for the purpose of encouraging acid formation and preventing the development of foreign organisms. I conduct my fermentation at a high temperature, preferably 23°-35° C. (73°-95° F.), checking the same by chilling when the gravity of the solution has decreased by about 8% Balling, which may take place after fermentation has proceeded from 6 to 12 hours.

The fermentation being arrested by cooling the solution to about 32° F., the yeast is separated from the solution by filtration or otherwise. The filtered solution is then diluted with hopped but unfermented sparging water which may have a saccharometer indication of about 2% Balling in such proportion to give a solution containing less than .9% of alcohol by volume, from 5 to 8% of extracts and having a saccharometer indication of from 5 to 8% Balling, which may be accomplished by using 1 part of fermented solution and 2-3 parts of the 2% solution above specified. This mixture is then fined in the manner customary in brewing and stored from 2 to 6 days at a temperature not to exceed 30° F. The beverage is then thoroughly impregnated with carbonic acid gas, filtered through an efficient pulp filter while being maintained at this low temperature, and then bottled and pasteurized in the usual manner. The object of maintaining the low temperature above specified is to coagulate and throw out of the solution the remaining yeast and other organisms together with certain of the hop resins and substances of proteid nature which become insoluble at the low temperature. As these matters are separated at the same low temperature by filtration, the resulting beverage is rendered insensitive to changes of temperature, and is at the same time freed, or practically freed from fermentative and other organisms, and will therefore remain brilliant for a considerable period.

It will be seen from the above that the preferred embodiment of my process as hereinbefore set forth differs from known processes of preparing beer or other similar fermented beverages, so called "temperance beers," non-alcoholic beers, etc., in the following important respects among others:

1. The use of a highly concentrated wort, 25-30% Balling. (The gravity in Balling per cent. of the worts usually employed in the manufacture of beers, temperance beers, etc., varies between 11-16%).

2. The employment of a yeast containing acid forming bacteria, and capable of fermentation at high temperature which at the same time is conducive to the development of the aforesaid bacteria, and accompanying acid formation.

3. Fermentation temperatures of from 23°-35° C. (73°-95° F.) in open vats favoring the loss of alcohol during fermentation and encouraging acid and ester formation, and the production of a vinous flavor.

4. Completion of fermentation within from 6-12 hours.

5. Elimination of long storage period.

6. Complete utilization of all raw materials and products of fermentation.

The advantages of the embodiment of my process described herein are numerous. By preparing a concentrated mash at a temperature of from 70°-80° C. (167°-176° F.) as aforesaid, a solution is obtained which is extremely low in fermentable sugars and possessing a sugar non sugar ratio of 1:0.87 while the customary sugar non sugar ratio is as 1:0.66 or 1:0.77. The final degree of attenuation which can be reached in a mash of this sort is 66% as compared with 77% by other methods. In the preparation of a beer of low alcoholic content or similar beverage it is imperative that the wort employed contain as little as possible of fermentable substances.

A further advantage of my process is that, by using the high pitching temperature less refrigeration is required to cool the solution to the pitching temperature, and no refrigeration is required during the process of fermentation. Furthermore, owing to the high concentration of the mash a mash tub of only small dimensions is required. The same holds with regard to the kettle and fermenting tubs.

Fermentation being completed in from 6 to 12 hours, this represents a great saving in time even over any of the customary top-fermentation systems. It also has the advantage that there is less danger of the development of foreign organisms, inasmuch as the high temperature and the acid formed by the acid bacteria which reproduce rapidly at this temperature exert a restraining influence upon the development of foreign organisms.

Fermentation at high temperatures brings about a vinous character, and the fermentation being conducted in open vats also hastens the partial loss of alcohol by spontaneous evaporation.

My process brings about an economy in fuel, there being no prolonged hop boiling or concentration of wort, and no necessity for the evaporation of alcohol.

The sparging water employed for sparging the grains is also used for sparging the hops employed in the hopping of the heavy wort, and the whole liquor so obtained after being hopped is employed for diluting the fermented extract, thus resulting in a perfect utilization of all materials.

By the fermentation of a concentrated wort and only slight dilution with an unfermented wort I obtain a beverage rich in fermentation flavor, heretofore impossible with any of the customary processes.

While I have described in detail the preferred practice of my process it is to be understood that the details of procedure and proportions of materials may be variously modified without departing from the spirit of the invention or the scope of the subjoined claims.

Having thus described the invention, I claim:—

1. The process of producing a beverage of the character described which comprises fermenting hopped wort of approximately from 25 to 35 per cent. Balling gravity, and containing only a relatively small amount of readily fermentable carbohydrates with yeast which is associated with acid forming bacteria at a relatively high fermentation temperature.

2. The process of producing a beverage of the character described which comprises fermenting hopped wort of approximately from 25 to 35 per cent. Balling gravity, and containing only a relatively small amount of readily fermentable carbohydrates with yeast which is associated with acid forming bacteria at a temperature of from about 23° to 35° C.

3. The process of producing a beverage of the character described which comprises fermenting hopped wort of approximately from 25 to 35 per cent. Balling gravity, and containing only a relatively small amount of readily fermentable carbohydrates with yeast which is associated with acid forming bacteria at a temperature of from approximately 23° to 35° C. for approximately from six to twelve hours.

4. The process of producing a beverage of the character described which comprises fermenting hopped wort of approximately from 25 to 35 per cent. Balling gravity, and containing only a small amount of readily fermentable carbohydrates with vinegar ferment at a temperature of from 23° to 35° C. and completing the fermentation to the desired point within approximately from six to twelve hours.

5. The process of producing a beverage of the character described which comprises fermenting hopped wort of approximately from 25 to 35 per cent. Balling gravity and containing only a small amount of readily fermentable carbohydrates with vinegar ferment at a temperature of approximately from 23° to 35° C., completing the fermentation to the desired point within from approximately six to twelve hours, and diluting the resulting beverage with hopped sparging water.

6. The process of producing a beverage of the character described which comprises fermenting hopped wort of approximately from 25 to 35 per cent. Balling gravity and containing only a small amount of readily fermentable carbohydrates with vinegar ferment at a temperature of from approximately 23° to 35° C., completing the fermentation to the desired point within approximately from six to twelve hours, diluting with hopped sparging water, storing for approximately from two to six days and carbonating.

7. The process of producing a beverage of the character described, which comprises fermenting hopped malt wort of approximately from 25 to 35 per cent. Balling gravity and containing only a small amount of readily fermentable carbohydrates with vinegar ferment at a temperature of approximately from 23° to 35° C., completing the fermentation to the desired point within approximately from six to twelve hours, separating the yeast, diluting with hopped sparging water, fining, storing for approximately from two to six days, carbonating and filtering.

8. The process of producing a beverage of the character described, which comprises mashing malt with water at a temperature of approximately from 75° to 80° C. until the disappearance of the starch reaction to produce a heavy malt wort, boiling the wort with hops until its gravity is increased by evaporation of water so as to show a saccharometer indication of approximately from 25 to 35 per cent. Balling gravity and pitching with yeast associated with acid forming bacteria at a temperature of approximately from 20° to 25° C.

9. The process of producing a beverage of the character described, which comprises mashing malt with water at a temperature of from approximately 75° to 80° C. until the resulting wort shows a saccharometer indication of approximately from 20 to 25 per cent. Balling, boiling the wort with hops until its gravity is increased by evaporation of water so as to show a saccharometer indication of approximately from 25 to 35 per cent. Balling, cooling to at least a relatively high fermenting temperature and fermenting at a relatively high fermenting temperature.

10. The process of producing a beverage of the character described, which comprises mashing malt with water at a temperature of from approximately 75° to 80° C., until the resulting wort shows a saccharometer indication of approximately from 20 to 25 per cent. Balling, boiling the wort with hops until its gravity is increased by evaporation of water so as to show a saccharometer indication of approximately from 25 to 35 per cent. Balling, cooling to at least a relatively high fermenting temperature and fermenting at a temperature of approximately from 23° to 35° C.

11. The process of producing a beverage of the character described, which comprises mashing malt with water in the approximate proportions of two parts by weight of malt to five parts by weight of water, at a temperature of from approximately 75° to 80° C. until the resulting wort shows a saccharometer indication of approximately from 20 to 25 per cent. Balling, boiling the wort with hops until its gravity is increased by evaporation of water so as to show a saccharometer indication of approximately from 25 to 35 per cent. Balling, cooling to at least a relatively high fermenting temperature and fermenting at a relatively high fermenting temperature.

12. The process of producing a beverage of the character described, which comprises mashing malt with water in the approximate proportions of two parts by weight of malt to five parts by weight of water, at a temperature of from approximately 75° to 80° C. until the resulting wort shows a saccharometer indication of approximately from 20 to 25 per cent. Balling, boiling the wort with hops until its gravity is increased by evaporation of water so as to show a saccharometer indication of approximately from 25 to 35 per cent. Balling, cooling to at least a relatively high fermenting temperature, fermenting at a temperature of approximately from 23° to 35° C. for approximately from six to twelve hours, separating the yeast, diluting with hopped sparging water, fining, storing for approximately from two to six days, carbonating and filtering.

13. A hopped fermented beverage of vinous and aromatic character produced as hereinbefore described, containing less than .9 per cent. of alcohol by volume and approximately from 5 to 8 per cent. of extract including a small amount of fermentable carbohydrates and proteids.

In testimony whereof I affix my signature in presence of two witnesses.

CARL A. NOWAK.

Witnesses:
LAWRENCE W. LEDVINA,
EDWARD J. ZEMAN.